(12) United States Patent
Murphrey et al.

(10) Patent No.: US 6,675,317 B2
(45) Date of Patent: Jan. 6, 2004

(54) METHOD AND SYSTEM FOR DETERMINING ERASE PROCEDURES RUN ON A HARD DRIVE

(75) Inventors: Stephen Woodrow Murphrey, Apex, NC (US); David B. Rhoades, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 09/738,810

(22) Filed: Dec. 14, 2000

(65) Prior Publication Data

US 2002/0078396 A1 Jun. 20, 2002

(51) Int. Cl.⁷ ............................................... G06F 11/00
(52) U.S. Cl. ............................................ 714/5; 714/57
(58) Field of Search ........................ 707/206; 711/159; 369/13.04, 53.45, 13.16, 13.25; 714/57, 5, 8

(56) References Cited

U.S. PATENT DOCUMENTS

| | | | |
|---|---|---|---|
| 5,132,853 A | 7/1992 | Kulakowski et al. ......... 360/48 |
| 5,412,668 A | 5/1995 | Dewey ....................... 371/40.1 |
| 5,553,086 A | 9/1996 | Sompel et al. ............. 371/47.1 |
| 5,617,380 A | 4/1997 | Holmstrom .................. 369/14 |
| 5,632,012 A | 5/1997 | Belsan et al. .......... 395/182.04 |
| 5,715,424 A | 2/1998 | Jesionowski et al. ....... 395/440 |
| 5,751,733 A | 5/1998 | Glover ....................... 371/40.3 |
| 5,860,124 A * | 1/1999 | Matthews et al. .......... 711/165 |
| 5,883,868 A | 3/1999 | Iwanaga ..................... 369/54 |
| 5,928,370 A * | 7/1999 | Asnaashari .................. 714/48 |
| 5,936,786 A | 8/1999 | Go ............................. 360/72.2 |
| 5,978,952 A * | 11/1999 | Hayek et al. ................ 714/764 |
| 5,987,628 A * | 11/1999 | Von Bokern et al. ......... 714/48 |
| 6,000,023 A | 12/1999 | Jeon ........................... 711/173 |
| 6,049,437 A | 4/2000 | Wevers ....................... 360/48 |
| 6,049,899 A * | 4/2000 | Auclair et al. .............. 714/721 |
| 6,076,183 A * | 6/2000 | Espie et al. ................. 714/764 |
| 6,279,128 B1 * | 8/2001 | Arnold et al. ................ 714/49 |
| 6,560,725 B1 * | 5/2003 | Longwell et al. ............. 714/54 |

* cited by examiner

Primary Examiner—Robert Beausoliel
Assistant Examiner—Christopher S. McCarthy
(74) Attorney, Agent, or Firm—Sawyer Law Group, LLP

(57) ABSTRACT

A method and system for erasing a drive of a computer system is disclosed. The method and system include scrubbing the drive and writing a message to a portion of the drive such that the message will be provided to a user in response to the drive being booted after scrubbing. The message indicates that the drive has been scrubbed.

17 Claims, 4 Drawing Sheets

METHOD AND SYSTEM FOR DETERMINING ERASE PROCEDURES RUN ON A HARD DRIVE

FIELD OF THE INVENTION

The present invention relates to computer systems, and more particularly to a method and system for determining whether an erase procedure has run been on a hard drive.

BACKGROUND OF THE INVENTION

Computer systems are used for a variety of applications. For example, FIG. 1 depicts one embodiment of a portion of a conventional computer system 10. The conventional computer system 10 includes a monitor 12, the keyboard 14 and drives 16 and 18. Typically, one or more of the drives 16 and 18 are hard drives. The drives 16 and 18 the shown as being sectored. Thus, the drive 16 includes sector 0 20, sector 1 22, sector 2 24 through sector n 26. Similarly, the drive 18 includes sector 0 30, sector 1 32, sector 2 34 through sector n 36. The conventional computer system 10 could include other components which, for the sake of clarity, are not shown. The conventional computer system 10 could be a desktop system, a workstation, a laptop, a server, or other computer system.

Often, the user of the conventional computer system 10 desires to replace the conventional computer system 10 with another system (not shown). For example, in a business, the conventional computer system 10 may be redistributed to another employee or discarded when the employee using the conventional computer system 10 receives a new system. However, the conventional computer system 10 may include sensitive for confidential data on one or more of the drives 16 and 18. Therefore, before discarding or redistributing the conventional computer system 10, all data should be removed from the drives 16 and 18.

FIG. 2A depicts a conventional method 50 for a scrub program that erases, or removes data from, the drives 16 and 18 of a computer. The conventional method 50 is typically carried out for each drive of the computer system 10 being reused or discarded. In addition, the conventional method 50 may be carried out multiple times for each drive. The information for the drive is obtained, via step 52. For example, this information might include the serial number of the drive. The write buffer (not shown in FIG. 1) is then initialized with an overwrite pattern, via step 54. The overwrite pattern is then written to each sector of the drive, via step 56. Step 56 may also be repeated multiple times for each drive to ensure that data on the drive cannot be recovered. Step 56 is performed multiple times for each drive, typically when higher sensitivity data is desired to be removed. When the conventional method 50 is carried out for drives 16 and 18 having lower sensitivity data, step 56 is typically performed only once. In addition, in another conventional method, steps 54 and 56 may be replaced by merely erasing the drive. However, in such a case, the data is typically recoverable.

FIG. 2B depicts a conventional method 60 for erasing the drive 16 and 18 and discarding the conventional computer system 10. A scrub program is run on the conventional computer system 10, via step 62. The scrub program removes the data on the drives 16 and 18, preferably so the data cannot be recovered. For example, step 62 typically includes running a scrub program which implements the conventional method 50. In a business, the conventional computer system 10 is provided to the appropriate organization for reuse or discarding, via step 64. For example, the conventional computer system 10 may be provided to a network administrator who is responsible for the business's computers. The removal of the data on the drives 16 and 18 is then manually validated, via step 66. Step 66 typically includes rerunning the scrub program on the conventional computer system 10. Step 66 could also include checking written material which comes with the conventional computer system 10. The written material could include a log which would indicate whether or not a scrub program has been run on the conventional computer system 10. In the alternative, step 66 could include checking each sector of the drives 16 and 18 to be sure that all data has been erased and cannot be recovered. The conventional computer system 10 can then be reused or discarded, via step 68.

Although the conventional method 60 allows the conventional computer system 10 to be reused or discarded, one of ordinary skill in the art will readily recognize that the conventional method 60 is inefficient. In particular, manually validating whether data has been removed from the drives 16 and 18, in step 66, may take a relatively long time. For example, rerunning the scrub program can take a long time because each sector of each drive 16 and 18 must be overwrite in at least once. In addition, this would duplicate work that might have already been done. Trusting a written log that indicates whether the scrub program has been run leaves open the possibility for error. For example, the log may incorrectly indicate that data has been removed from the drives 16 and 18. As a result, sensitive data may accidentally be released. Inspecting each sector of the drives 16 and 18 to ensure that sensitive data has been removed is also quite time-consuming. Thus, this validation of the removal of data is time-consuming and, therefore, costly. Not performing a validation of the removal of data is generally not an option because this would result in sensitive data being released.

Accordingly, what is needed is a system and method for rapidly and easily determining whether all of the data on a drive for a computer system has been removed. The present invention addresses such a need.

SUMMARY OF THE INVENTION

The present invention provides a method and system for validating that erasing a drive of a computer system has occurred. The method and system comprise scrubbing the drive and writing a message to a portion of the drive such that the message will be provided to a user in response to a computer system containing the drive being booted after scrubbing. The message indicates that the drive has been scrubbed.

According to the system and method disclosed herein, the present invention allows a user to rapidly and easily determine whether all of the data on a drive of a computer system has been erased.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art, and the generic principles herein may be applied to other embodiments. Thus, the present invention is not intended to be limited to the embodiment shown, but is to be accorded the widest scope consistent with the principles and features described herein.

Often, a computer system containing sensitive data is to be discarded or reused. In order to do so, it is desirable to erase the drives, such as hard drives, of the computer system. For example, it may be desirable to remove data from the drives 16 and 18 of the conventional computer system 10 depicted in FIG. 1 before discarding or redistributing the conventional computer system 10. Typically, this is done by erasing and/or overwriting the entire drive 16 or 18. In other words, the drive 16 or 18 is scrubbed. However, before discarding or distributing the conventional computer system 10 to another individual for use, it is desirable to validate whether the drives 16 and 18 have been scrubbed. One of ordinary skill in the art will readily realize that conventional methods for validating that data has been removed from the drives 16 and 18 are time-consuming and, therefore, costly. For example, conventional methods for validating that the drives 16 and 18 have been erased include rerunning a scrub program on the drives 16 and 18, relying on documentation indicating that the drives 16 and 18 have been scrubbed, or somehow checking each sector of each of the drives 16 and 18 to ensure that the data has been removed.

The present invention provides a method and system for erasing a drive of a computer system. The method and system comprise scrubbing the drive and writing a message to a portion of the drive such that the message will be provided to a user in response to the drive being booted after scrubbing. The message indicates that the drive has been scrubbed.

The present invention will be described in terms of a particular computer system and a particular method for allowing a user to determine whether a drive has been erased. However, one of ordinary skill in the art will readily recognize that this method and system will operate effectively for other computer system and other methods. For example, the method and system in accordance with the present invention are consistent with other methods for erasing the drive and other messages indicating the drive has been erased. In addition, although described in the context of drives attached to a computer system, nothing prevents the method and system in accordance with the present invention from being used with drives that are separable from the computer system.

Figure 1:
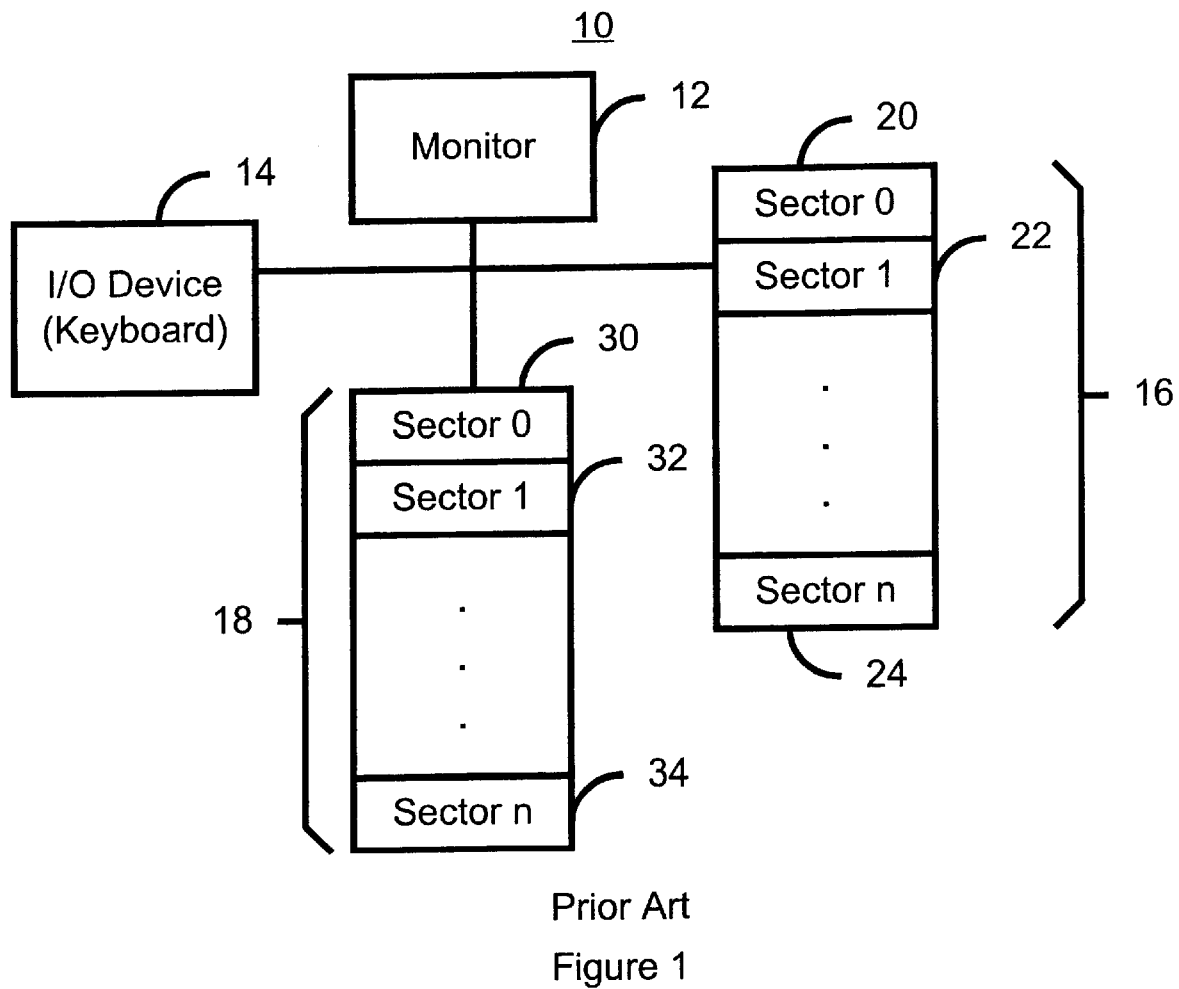
FIG. 1 is a block diagram of a conventional computer system.
Figure 2A:
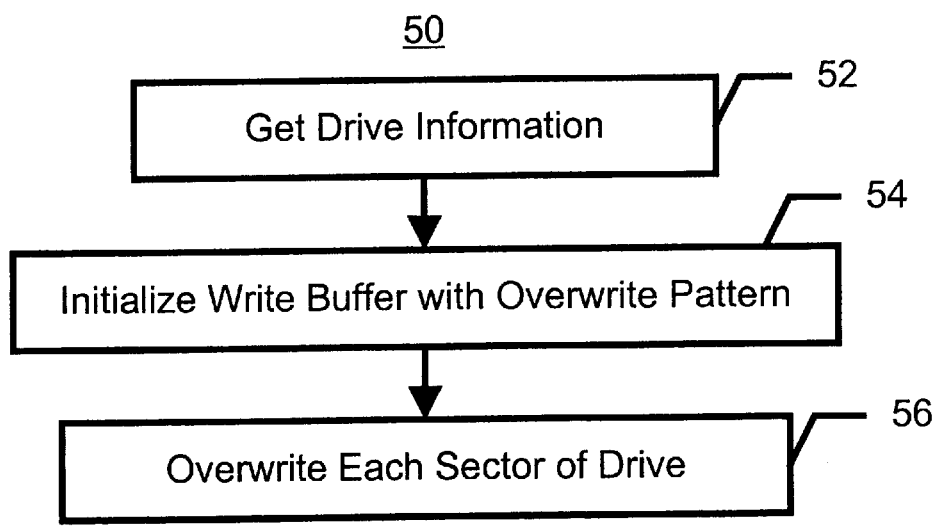
FIG. 2A is a flow chart depicting a conventional method for removing data from a drive.
Figure 2B:
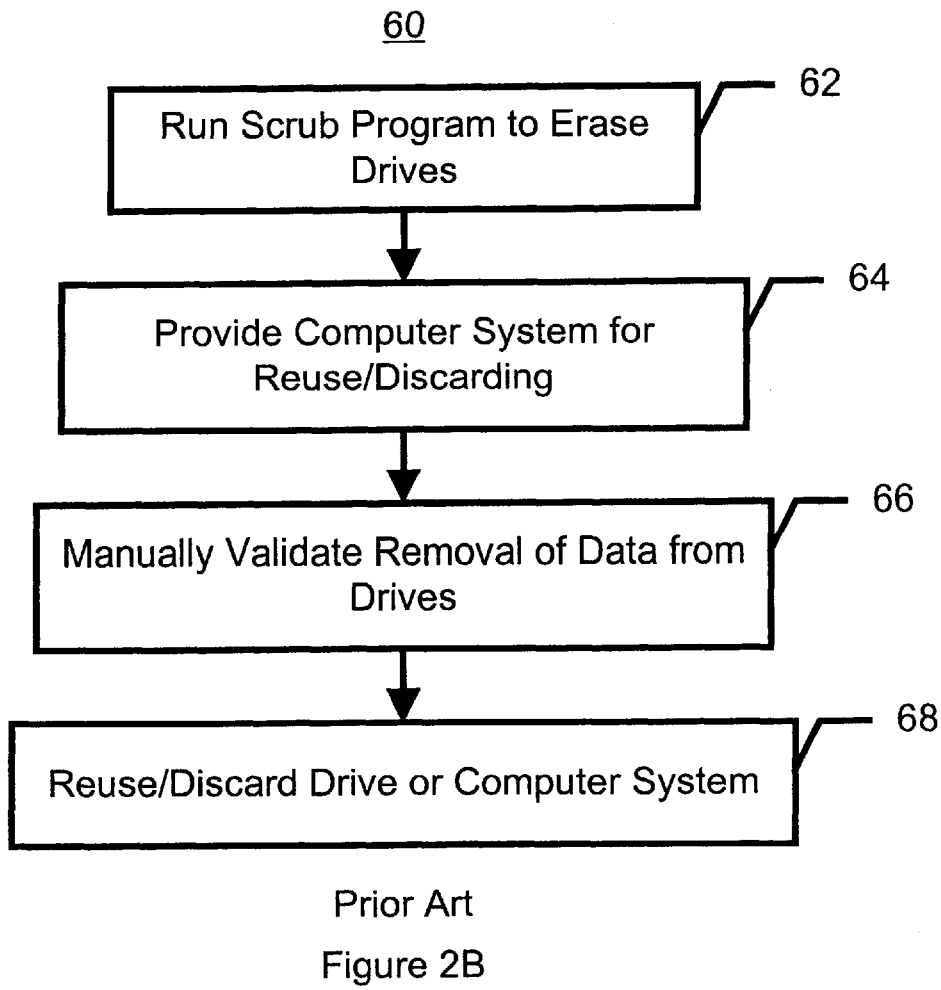
FIG. 2B is a flow chart depicting a conventional method for scrubbing and later reusing or discarding the conventional computer system.
Figure 3:
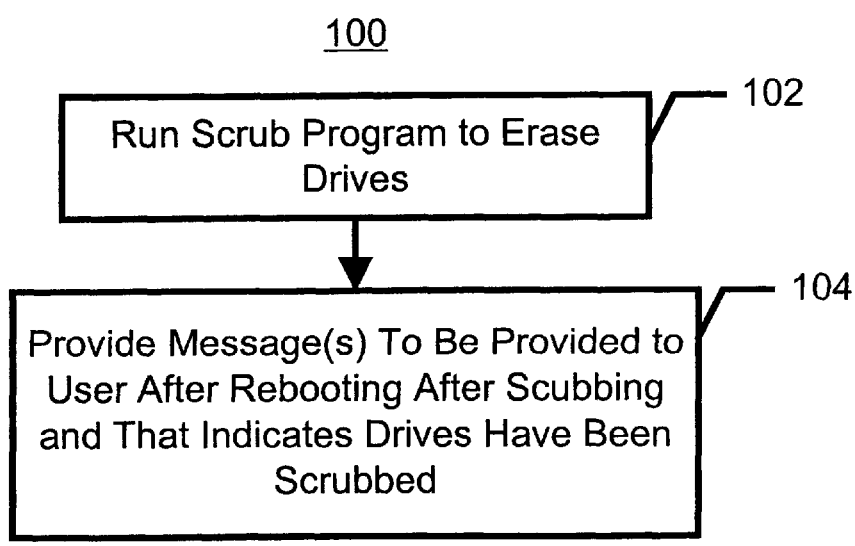
FIG. 3 is a high-level flow chart of a method for erasing a drive in accordance with the present invention.

To more particularly illustrate the method and system in accordance with the present invention, refer now to FIG. 3, depicting a high-level flow chart of one embodiment of a method 100 in accordance with the present invention for erasing drives of the computer system. The method 100 will be explained utilizing the conventional computer system 10 depicted in FIG. 1. Referring to FIGS. 1 and 3, the drives 16 and 18 of the conventional computer system 10 are scrubbed, via step 102. Step 102 preferably includes overwriting each sector of the drives 16 and 18 to help ensure that any data stored on the drives 16 and 18 cannot be recovered. A message or messages regarding the scrub program is provided on a portion of the drives 16 and 18, via step 104. The message indicates that the drives 16 and 18 have been scrubbed. A message is preferably provided on each of the drives 16 and 18 that have been scrubbed. The message is provided to the user after and preferably in response to the drives being booted after scrubbing. The message preferably includes the name and version of the scrub program that was run, the date and time the scrub program was run, any command line parameters, a return code, and a validation checksum indicating the identity of the drive. In a preferred embodiment, the message can optional include the name of the individual who ran the scrub program and any comments desired.

Figure 4:
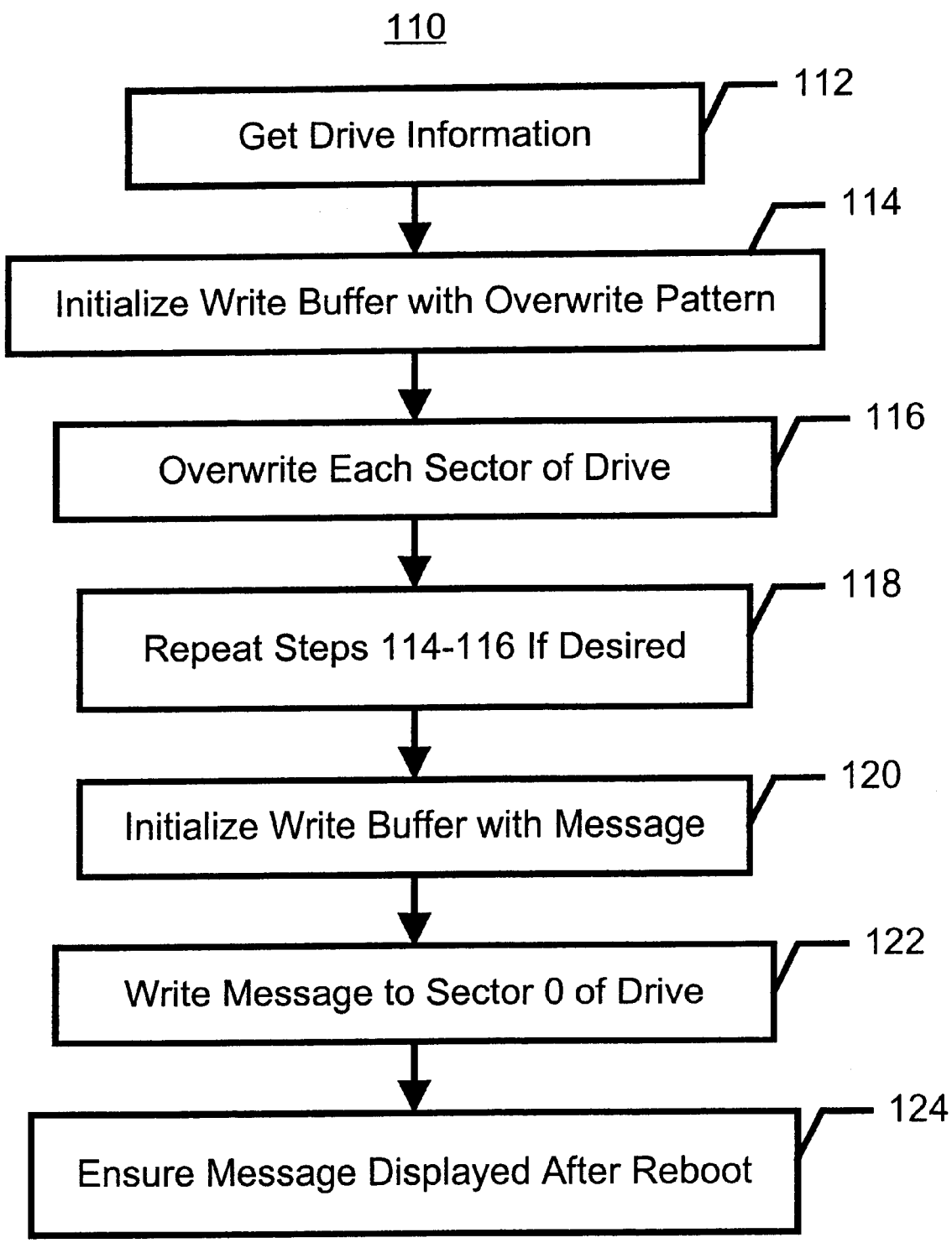
FIG. 4 is a more detailed flow chart of a method for erasing a drive in accordance with the present invention.

FIG. 4 depicts a more detailed flow chart of one embodiment of a method 110 in accordance with the present invention for erasing drives of computer system. The method 110 will be described in conjunction with the conventional computer system 10 depicted in FIG. 1. However, nothing prevents the method 110 from being used with another computer system. Referring to FIGS. 1 and 4, the method 110 is the preferred process for each of the drives 16 and 18 being erased. The information for the drive currently being erased is obtained, via step 112. For example, the information obtained may identify the drive. Such information might include the serial number for the drive. The write buffer is then initialized with the overwrite pattern, via step 114. The overwrite pattern is then written to each sector of the drive 16 or 18, via step 116. Thus, any data in the sector of the drive 16 or 18 is overwritten in step 116. If desired, steps 114 and 116 are repeated for the other sectors of the drive, via step 118. For example, if greater security is desired, then step 118 may repeat the steps 114 and 116 multiple times. However, if only minimal security is desired, then steps 114 and 116 are only performed once. Consequently, steps 112 through 118 essentially perform a scrubbing operation, thereby erasing data from the drive 116 or 118.

Once the drive to 16 or 18 has been erased, the write buffer is initialized with the message, via step 120. The message indicates that the scrub program has been run. The message will be provided to the user when the computer system 10 is booted after scrubbing. The message provided is preferably the message described above with respect to the method 100 depicted in FIG. 3. Referring back to FIG. 4, the message is written into sector zero 20 or 30 of the drive 16 or 18 being erased, via step 122.

It is ensured that the message will be displayed after the drive is booted, via step 124. In a preferred embodiment, step 124 alters the master boot record for the drive 16 or 18 being erased such that the message will be displayed after the drive 16 or 18 is booted. In a preferred embodiment, this is accomplished by adding code to the master boot record. In such an embodiment, the code ensures that an identification of the drive is obtained. In one embodiment, the identification includes a checksum computed from the serial number for the drive 16 or 18. Also in the preferred embodiment, code added to the master boot record causes the message to be displayed if a checksum computed for the drive 16 or 18 after booting matches the stored checksum. Thus, if the identity of the drive booted is the same as the drive scrubbed, then the message is displayed. If the checksum computed for the dive 16 or 18 after booting does not match the stored checksum, then an error message is provided. Thus, the drive can be erased and a message describing the erasure of the drive provided The methods 100 and 110 in accordance with the present invention allow a user to determine rapidly and easily whether the drives of interested have been erased. Thus, it is possible to rapidly tell whether a scrub program has been run on a particular computer system. By accessing the message after booting the drives 16 and 18 an individual can determine whether the data has been removed from the drives 16 and 18, respectively. Each sector of the drives 16 and 18 need not be inspected manually. In addition, documentation need not be relied upon to determine whether data has been removed for the drives 16 and 18. Moreover, the scrub program need not be rerun in order to ensure that data has been removed from the drive 16 and 18. Instead, the message can inform a user that the drives 16 and 18 have been erased. Consequently, time and resources are saved.

Figure 5A:
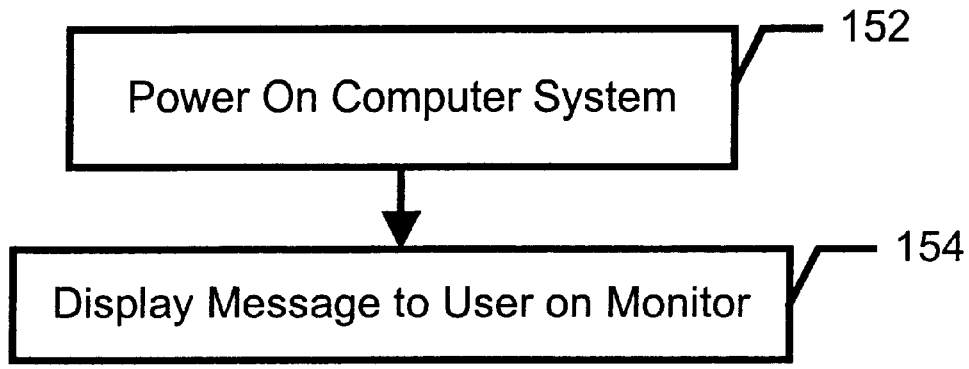
FIG. 5A is a high-level flow chart of a method for determining whether a computer's boot drive has been erased in accordance with the present invention.

FIG. 5A depicts a high-level flow chart of one embodiment of a method 150 for determining whether a drive has been erased when the method 100 or 110 in accordance with the present invention has been used. The method 150 is described in conjunction with the conventional computer system 10 depicted in FIG. 1. The method 150 commences with the computer system 10 being powered on, via step 152. Note that if the drives 16 or 18 have not been installed in the computer system 10, then the drive is installed prior to step 152. Because the computer system is powered on at step 152, the computer system automatically boots the drive 16 or 18. The message provided in the method 100 or 110 is then provided to the user, via step 154. In one embodiment, the message is displayed on the monitor 12 of the computer system 10. In another embodiment, the message might be provided in another fashion. In addition, the message might be provided to program that inspects the drives 16 or 18 and provides the message to the user.

Figure 5B:
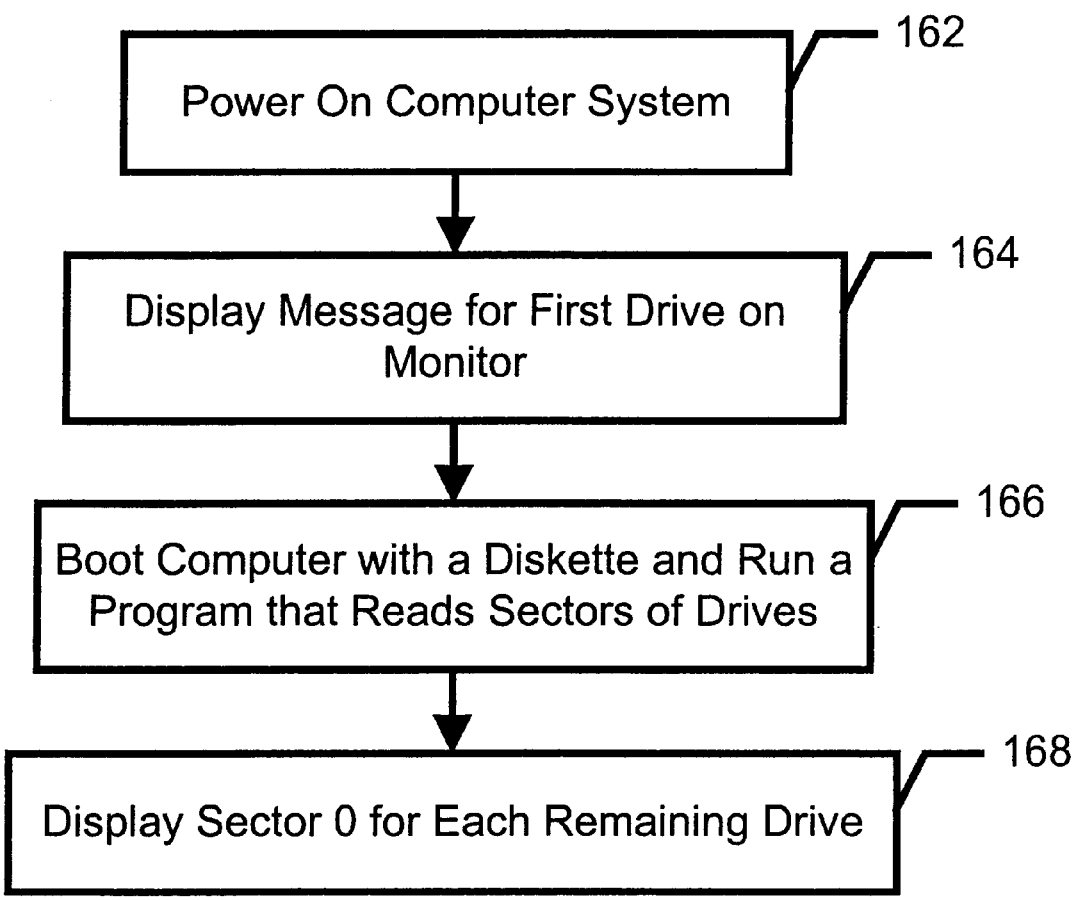
FIG. 5B is a more detailed flow chart of a method for determining whether the drives on a computer that contains more than one drive have been erased in accordance with the present invention.

FIG. 5B is a more detailed flow chart of one embodiment of a method 160 the in accordance of the present invention for determining whether a drive has been erased when the method 100 or 110 in accordance with the present invention has been used. The method 160 is described in conjunction with the conventional computer system 10 depicted in FIG. 1. The method 160 commences with the computer system 10 being powered on, via step 162. Note that if the drives 16 or 18 have not been installed in the computer system 10, then the drive will be installed prior to step 162. Because the computer system is powered on at step 162, the computer system automatically boots the drive 16 or 18.

The message regarding the scrub operation for a particular drive 16 or 18 is then displayed, via step 164. The user then boots the computer system 10 again, preferably using an operating system stored on a diskette, or does some type of network boot, via step 166. The user then preferably runs a utility program that allows a user to read individual sectors of the disks 16 and 18, via step 168. The program then displays the sector containing the message, preferably sector 0, for each of the remaining drives, via step 170. Thus, a user can rapidly and easily determine whether each drive for the computer system 10 has been scrubbed, or erased. Moreover, if additional information is provided in the message, a user can have access to that message, too Thus, using the methods 150 or 160, a user can rapidly and easily determine whether a scrub program has been run for each of the drives. It can relatively easily be determined whether data has been removed from the drives of the computer system. As a result, discarding or redistribution of drives and/or computer systems is simplified and made much more efficient.

A method and system has been disclosed for identifying whether an erase procedure has been run a drive. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for erasing a drive of a computer system comprising the steps of:
    (a) scrubbing the drive; and
    (b) writing a message to a portion of the drive such that the message will be provided to a user in response to the drive being booted after scrubbing, the message indicating that the drive has been scrubbed.

2. The method of claim 1 wherein the message further indicates when the scrubbing step (a) was performed.

3. The method of claim 1 wherein the scrubbing step (a) is performed using a scrub program having a type and wherein the message further indicates the type of the scrub program.

4. The method of claim 1 wherein the message writing step (b) further includes the steps of:
    (b1) providing a master boot record for the drive; and
    (b2) writing the message to the master boot record.

5. The method of claim 1 wherein the scrubbing step (a) is performed using a scrub program and wherein the message further includes a description of the scrubbed program, an indication of when the scrub program was run, and an identification of an individual who ran the scrub program.

6. The method of claim 1 wherein the message is provided to the user by displaying the message when the drive is booted.

7. The method of claim 1 wherein the drive further includes a first sector and wherein the message is provided to the user by providing the message to a program capable of viewing the first sector.

8. The method of claim 1 wherein the drive further has an identification and wherein the message writing step (b) further includes the steps of:
    (b1) providing a hash of the identification of the drive; and
    (b2) writing the message to the portion of the drive.

9. A computer-readable medium containing a program for erasing a drive of a computer system, the program including instructions for:
    (a) scrubbing the drive; and
    (b) writing a message to a portion of the drive such that the message will be provided to a user in response to the drive being booted after scrubbing, the message indicating that the drive has been scrubbed.

10. The computer-readable medium of claim 9 wherein the message further indicates when the scrubbing instructions (a) were performed.

11. The computer-readable medium of claim 9 wherein the scrubbing instructions (a) are performed using a scrub program having a type and wherein the message further indicates the type of the scrub program.

12. The computer-readable medium of claim 9 wherein the message writing instructions (b) further includes instructions for:

(b1) providing a master boot record for the drive; and (b2) writing the message to the master boot record.

13. The computer-readable medium of claim 9 wherein the scrubbing instructions (a) are performed using a scrub program and wherein the message further includes a description of the scrubbed program, an indication of when the scrub program was run, and an identification of an individual who ran the scrub program.

14. The computer-readable medium of claim 9 wherein the message is provided to the user by displaying the message when the drive is booted.

15. The computer-readable medium of claim 9 wherein the drive further includes a first sector and wherein the message is provided to the user by providing the message to a program capable of viewing the first sector.

16. The computer-readable medium of claim 9 wherein the drive further has an identification and wherein the message writing instructions (b) further include instructions for:

(b1) providing a hash of the identification of the drive; and (b2) writing the message to the portion of the drive.

17. A computer system comprising:

an erased drive; and a message written to a portion of the drive such that the message will be provided to a user in response to the drive being booted after scrubbing, the message indicating that the drive has been scrubbed.

* * * * *